United States Patent Office 3,716,646
Patented Feb. 13, 1973

3,716,646
BACTERICIDAL COMPOSITION AND METHODS EMPLOYING METHYLENE-2,2'-BIS(4-CHLOROTHYMOL)
Lucien Nouvel, 91 Avenue des Ternes, Paris, France
No Drawing. Filed Mar. 23, 1966, Ser. No. 536,664
Claims priority, application France, Mar. 24, 1965, 10,468
Int. Cl. A61k 27/00
U.S. Cl. 424—347                                   11 Claims

ABSTRACT OF THE DISCLOSURE

Methylene-2,2'-bis(4-chlorothymol) is employed as a medicinal against gram positive bacteria.

---

This invention concerns a bactericidal composition characterised in that it contains, as active substance, methylene 2,2'-bis(4-chlorothymol), the developed formula of which is:

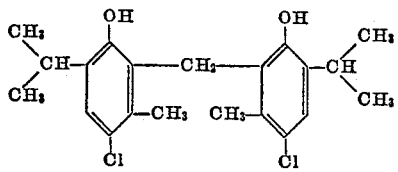

The bactericidal properties of this compound are especially active on gram positive bacilli, in particular on *Staphylococcus londinii*, Staphylococcus 133, Streptococcus, Pneumococcus.

The compound of the present invention can be used as a medicine for infections of the respiratory passages.

The active substance according to the invention may be associated with a therapeutic carrier in the form of a tablet, lozenge to be sucked, a suppository, disinfectant solution, pommade, ovule, granulates, gelule, aerosol or emulsion.

Medicine may be administered containing the compound in a dose of 0.1 to 1 g. per day. Some of the possible manners of using the active substance according to the invention are shown in the following non limitative examples.

The new bactericide compound according to the invention brings about an important improvement in therapeutical applications of phenolic substances; in fact, phenols are very good bactericides, but most of them can be used only externally, because of their toxicity. It is a surprising fact that methylene-2,2'-bis(4-chlorothymol) exhibits a strong bactericide action while its toxicity is very low and then it may be introduced into human body at relatively large doses. Experience showed this compound is more active against Staphylococci, Streptococci, Brucellae etc. than Soframycine does, while it is far less toxic than the mycine. Thus, the new bactericide according to the invention completely inhibits the growth of Streptococci at a dilution of 1:2,000,000 and that of Staphylococci at a dilution of 1:4,000,000; as to its toxicity, it may be considered as negligible, $DL_{50}$ in rat (orally tested) being 11.7 g./kg., what would correspond to about 800 g. for a human body weighing 70 kg.

EXAMPLE 1

Composition of a dressing to be atomised as an aerosol on wounds:

Active substance, 1 to 5 percent.
Plasticizing excipient, q.s.

The excipient may also contain a local anaesthetic, such as, for example lignocaine hydrochloride, and a haemostatic such as antipyrin or adrenalone hydrochloride.

EXAMPLE 2

Formula for nasal aerosol:

Active substance, 1 to 2 percent.
Emulsified excipient, q.s.

EXAMPLE 3

Composition of aerosol for throat:

Active substance, 1 to 2 percent.
Glycerine excipient, q.s.

The excipient may contain pectin, lignocaine hydrochloride and ammonium glycyrhizate.

EXAMPLE 4

Formula to be used in suppositories for coughs, corresponding to the following compositions:

|  | Milligrams | | |
| --- | --- | --- | --- |
|  | Adults | Children over 5 | Infants |
| Methylene 2,2'-bis(4-chlorothymol) | 50-250 | 25-125 | 12-62 |
| Eucalyptole | 100-200 | 50-100 | 25-50 |
| Paracetamole | 200-500 | 100-250 | 50-125 |
| Glyceryl guaiacolate | 50-100 | 25-50 |  |
| Sodium camphosulphonate | 20-100 | 10-50 | 5-25 |
| Pholcodine | 15 | 7.5 |  |
| Butyl paraoxybenzoate | 3 | 1.5 | 1.6 |
| Excipient, q.s. |  |  |  |

Pholcodine may be replaced by any other antitussibe such as codein, dionin or noscapin. In the latter case the content of noscapin may be, for example:

Adults, from 20 to 50 mg.
Children, from 10 to 25 mg.

EXAMPLE 5

Ovules

Active substance, from 100 to 500 mg.
Excipient, q.s.

EXAMPLE 6

Mouth washes

Active substance, from 1 to 5 percent.
Emulsified excipient, q.s.

EXAMPLE 7

Throat lozenges

Active substance per lozenge, from 10 to 50 mg.
Sweet excipient, q.s.

EXAMPLE 8

Lotion for application to the skin

Active substance, from 1 to 5 percent.
Emulsified alcoholic or oily excipient, q.s.

Methylene 2,2'-bis(4-chlorothymol), which may also be called 2,2'-bis(4-chlorothymol)-methane, is preferably obtained by a process according to the invention which consists in reacting 4-chlorothymol with formaldehyde in an acid medium.

According to a preferred feature of the invention, chlorothymol is employed in suspension in a hydrocarbon and hydrochloric acid is added thereto accompanied by a tensio-active agent, capable of causing emulsion of the aqueous formaldehyde then mixed with the said suspension.

The proportion of acid is preferably approximately 0.1 to 0.4 mole per mole of chlorothymol and, more particularly 0.16 to 0.24. The quantity of formaldehyde is 0.5 to 0.7 mole HCHO per mole of chlorothymol.

The emulsified reaction mixture is kept for some hours at a temperature between room temperature, e.g. 50° C., and approximately 80° C., preferably between 50° C. and 60° C.

The hydrocarbon used to prepare the chlorothymol suspension may preferably be an alcane such as, in particular, pentane, hexane, heptane, octane.

Then tensio-active agent is preferably an ion agent, especially an alkali metal alkyl-benzene-sulphonate, the alkyl group or groups of which contain 6 to 24 atoms of carbon, such as for example sodium dodecyl-benzene-sulphonate.

The following example, which is not a limitation, illustrates the mode of preparation according to the invention.

EXAMPLE 9

92 g. of 4-chlorothymol are placed in suspension in 100 g. of heptane and 10 g. of aqueous hydrochloric acid at 22° Bé (35.4% HCl) and 1 g. of sodium dodecyl-benzene-sulphonate are added thereto under stirring: 25 g. of a 37% formaldehyde aqueous solution are introduced into the mixture with stirring. The temperature of the emulsified reaction mixture rises and it is kept between 50° and 60° C. for three hours. The mixture is then cooled in ice, with constant stirring until the crystallization, which is taking place, has ceased.

The crystals obtained are dried and washed in water until neutrality, then recrystallized in hexane.

I claim:

1. A method of combatting gram positive bacterial in humans comprising introducing into said humans a therapeutically effective amount for such combatting of methylene-2,2'-bis(4-chlorothymol).

2. A method according to claim 1 wherein the methylene-2,2'-bis(4-chlorothymol) is introduced into the respiratory passages of said humans.

3. A method according to claim 1 wherein the therapeutic is introduced orally.

4. A method according to claim 1 wherein the therapeutic is introduced nasally.

5. A medicinal composition comprising a gram positive bactericidal therapeutically effective amount of methylene-2,2'-bis(4-chlorothymol) as an active substance and a carrier, said composition being in the form of a lozenge, ovule, suppository or aerosol.

6. A composition according to claim 5 in the form of suppositories for infections of the respiratory passages, comprising an association of a conventional medicine selected from the group consisting of eucalyptole, glyceryl guaiacolate and pholcodine with 12 to 250 mg. of the said active substance for each suppository.

7. A composition according to claim 5 in the form of ovules each containing 100-500 mg. of the said active substance.

8. A composition according to claim 5 in the form of throat lozenges each containing from 10-50 mg. of the said active substance.

9. A composition according to claim 5 comprising 50-250 mg. of methylene-2,2'-bis(4-chlorothylmol), and additionally comprising 100-200 mg. of eucalyptole, 200-500 mg. of paracetamole, 25-50 mg. of glyceryl guaiacolate, 20-100 mg. of sodium camphosulphonate, 15 mg. of pholcodine and 3 mg. of butyl paraoxybenzoate.

10. A composition according to claim 5 comprising 25-125 mg. of methylene-2,2'-bis(4-chlorothylmol), and additionally comprising 50-100 mg. of eucalyptole, 100-250 mg. of paracetamole, 25,50 mg. of glyceryl guaiacolate, 10-50 mg. of sodium camphosulphonate, 7.5 mg. of pholcodine and 1.5 mg. of butyl paraoxybenzoate.

11. A composition according to claim 5 comprising 12-62 mg. of methylene-2,2'-bis(chlorothymol), and additionally comprising 25-50 mg. of eucalyptole, 50-125 mg. of paracetamole, 5-25 mg. of sodium camphosulphonate and 1.6 mg. of butylparaoxybenzoate.

References Cited

UNITED STATES PATENTS

| | | | |
|---|---|---|---|
| 1,870,107 | 8/1932 | Fuller | 167—64 |
| 2,498,656 | 2/1950 | DeGroote | 260—629 A |
| 2,597,717 | 5/1952 | Faith | 260—619 A |
| 2,632,775 | 3/1953 | Cooper | 260—619 A |
| 2,681,880 | 6/1954 | Dautrebande | 167—82 A |
| 2,796,445 | 6/1957 | Sullivan | 260—619 A |
| 2,822,404 | 2/1958 | Ambelang | 260—619 A |

OTHER REFERENCES

Merck, The Merck Index of Chemicals and Drugs, seventh edition, Merck and Co., Inc., Rahway, N.J. (1960), pp. 439, 500 and 694.

Dorlawd, Medical Dictionary, 18th edition, 1938, pp. 1105, 1343 and 1356–1358.

STANLEY J. FRIEDMAN, Primary Examiner

V. D. TURNER, Assistant Examiner

U.S. Cl. X.R.

424—248, 278, 308, 324, 332, 340